United States Patent [19]

Wiebe

[11] Patent Number: 4,539,864

[45] Date of Patent: Sep. 10, 1985

[54] ADJUSTABLE BALANCE WEIGHT FOR ROTATING SHAFT

[75] Inventor: David J. Wiebe, Palm Beach Gardens, Fla.

[73] Assignee: The United States of America as represented by the United States Secretary of the Air Force, Washington, D.C.

[21] Appl. No.: 393,267

[22] Filed: Jun. 29, 1982

[51] Int. Cl.³ ............................................. F16F 15/32
[52] U.S. Cl. ................................. 74/573 R; 464/180
[58] Field of Search ................. 73/457, 458, 468, 469, 73/470; 74/573 R; 418/151; 464/180, 183

[56] References Cited

U.S. PATENT DOCUMENTS

| | | | |
|---|---|---|---|
| 1,645,323 | 10/1927 | Griswold | 464/180 |
| 2,017,609 | 10/1935 | Sparrow | 74/573 |
| 2,241,637 | 5/1941 | Ernst et al. | 73/53 |
| 2,439,035 | 4/1948 | Bidwell et al. | 73/7 |
| 2,543,447 | 2/1951 | Elrod, Jr. | 74/573 |
| 2,780,939 | 2/1957 | Kellogg | 73/458 |
| 3,362,251 | 1/1968 | Francis | 74/573 |
| 3,611,829 | 10/1971 | Smith | 74/573 |
| 4,043,147 | 8/1977 | Wiebe | 464/180 |
| 4,455,887 | 6/1984 | Lissajoux et al. | 464/180 |

Primary Examiner—Gary L. Smith
Assistant Examiner—Michael F. Trettel
Attorney, Agent, or Firm—Donald J. Singer; John R. Flanagan

[57] ABSTRACT

A balance weight mechanism is attached to a tubular engine shaft for correcting unbalance in the engine. The tubular shaft includes a stiffener plate mounted therein transversely to the rotational axis of the shaft. The balance weight mechanism includes a balance weight arm and a fastener for releasably fastening an end of the arm to a generally central location on the stiffener plate where the axis of rotation of the shaft intersects the plate. Spline teeth on the balance weight arm face toward the stiffener plate and are aligned to intermesh with an arc of an annular spline ring on the plate for holding the arm in a desired angularly adjusted position extending outwardly radially from the axis of rotation of the shaft when the arm is fastened tightly against the plate.

4 Claims, 2 Drawing Figures

ADJUSTABLE BALANCE WEIGHT FOR ROTATING SHAFT

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to correction of engine unbalance and, more particularly, is concerned with a balance weight mechanism attachable in the center of an engine shaft and angularly adjustable in small increments about the rotational axis of the shaft for correcting unbalance in the engine.

2. Description of the Prior Art

The attaching of balance weights in selected positions around a rotating device in order to balance the device is old and well known as, for example, in the balancing of automobile wheels described in U.S. Pat. No. 2,780,939 to Kellogg. Examples of other applications of balancing weights are in dynamic balancing of an industrial machine tool in U.S. Pat. No. 2,241,637 to Ernst et al and in dynamic balancing of a shaft in a bearing test machine in U.S. Pat. No. 2,439,035 to Bidwell et al.

In engines of the type having relatively large hollow tubular drive shafts, one method of intershaft unbalance correction has been to attach a balance weight to one of the bolts which normally hold the stiffener plates in the shaft together. The drawback to this method of balancing is that it is limited to very large increments of angular adjustment. For example, if four bolts are used to hold the stiffener plates, the balance weight can be angularly adjusted in ninety degree increments; if eight bolts are used the angular increment is forty-five degrees. Therefore, a need exists for an unbalance correction technique which provides greater precision in adjustment of balance weight.

SUMMARY OF THE INVENTION

The present invention provides a balance weight mechanism designed to satisfy the aforementioned need. The advantage of the mechanism is that it allows the intershaft balance weight to be adjusted in small angular increments thereby permitting a very precise correction for unbalance. Also, the number of increments of angular adjustment, and thereby the degree of precision, may be tailored to the requirements of the particular application.

Accordingly, the present invention provides a balance weight mechanism attached to an engine shaft for correcting unbalance in the engine. The mechanism comprises: (a) support means mounted on the engine shaft in transverse relationship to the rotational axis thereof; (b) balance weight means; (c) means for attaching the balance weight means on the support means at a generally central location where the rotational axis of the shaft intersects the support means, the attaching means being adjustable for releasing and re-attaching the balance weight means; and (d) cooperating means on the support means and the balance weight means for maintaining the balance weight at a desired angular position when the balance weight means is re-attached to the support means.

More particularly, the support means is a shaft stiffener plate, the balance weight means is an elongated arm which extends away from the plate, and the cooperating means are interengaging teeth on the arm and plate and located between the same. Specifically, the balance weight means may be one of a plurality of arms made in different weight classes by varying the width and thickness of the arm. Thus, to correct for unbalance in a particular application, it is only necessary to select the proper size arm and adjust it to the desired angular position.

DETAILED DESCRIPTION OF THE INVENTION

Figure 1:
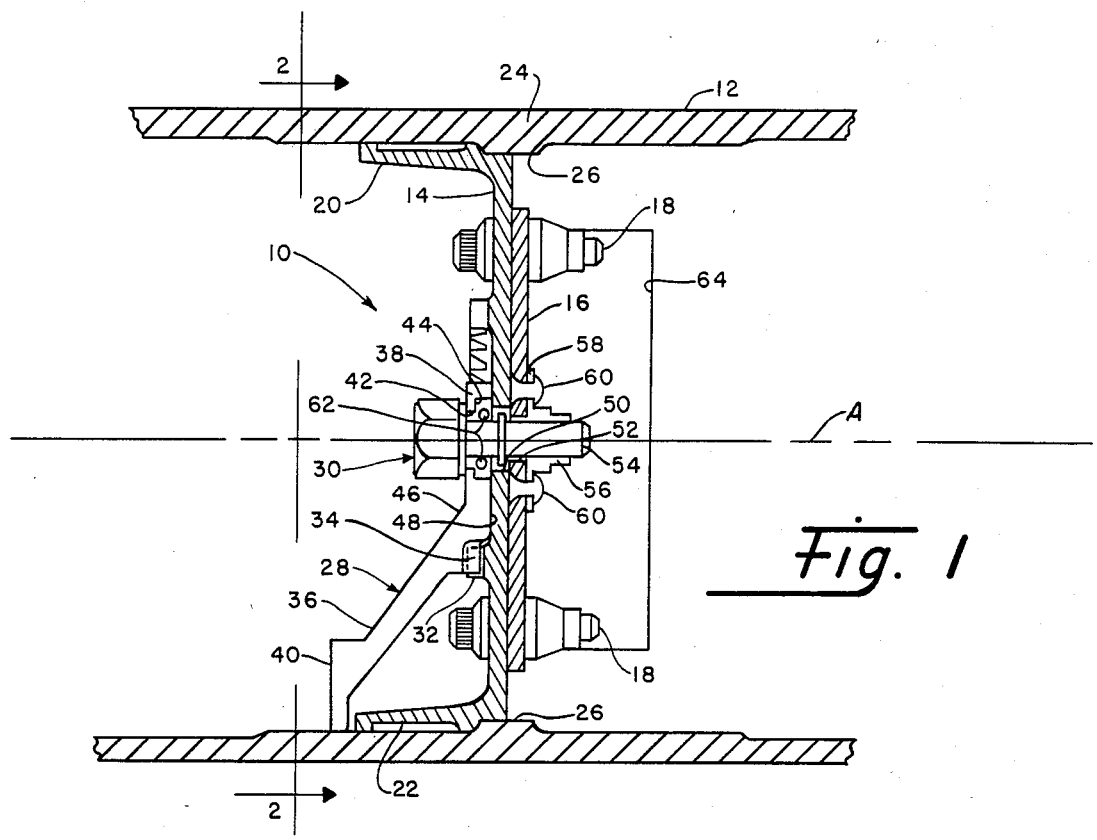
FIG. 1 is a fragmentary side elevational view, partly in section, of a hollow shaft of an engine with the balance weight mechanism of the present invention disposed therein.
Figure 2:
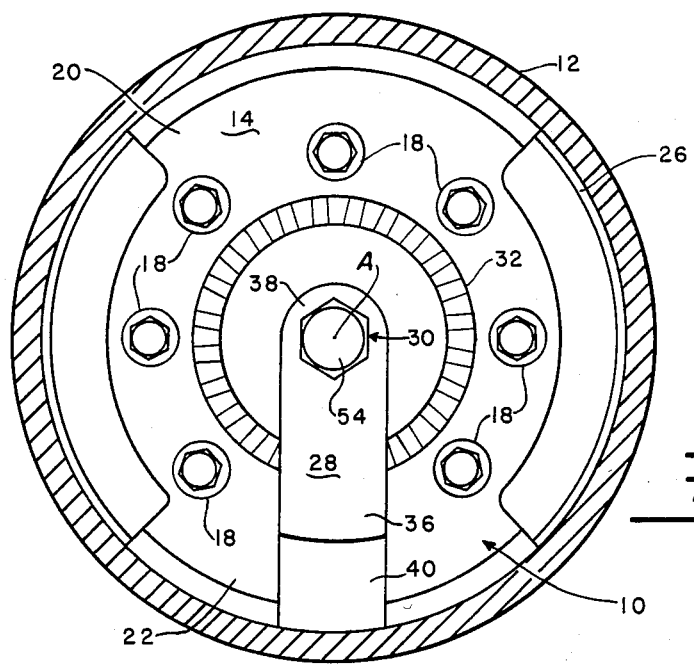
FIG. 2 is an end elevational view of the balance weight mechanism as seen along line 2—2 of FIG. 1.

Referring now to the drawings, there is shown the preferred embodiment of the balance weight mechanism of the present invention, being generally designated 10. The balance weight mechanism 10 is shown disposed in a hollow tubular drive shaft 12 of an engine. By way of example, the shaft might be a low pressure compressor drive shaft in a gas turbine engine. It should be understood, however, that mechanism 10 may be used with other shaft configurations.

Conventionally, the shaft 12 includes internal stiffening means in the form of stiffener plates 14, 16 at the mid span of the shaft 12. The stiffener plates are mounted within the tubular shaft 12 in generally transverse relationship to the rotational axis A of the shaft, with the smaller diameter plate 16 being attached to the rear side of the larger diameter plate 14 by a series of eight equally spaced apart bolts 18.

The larger stiffener plate 14 includes a pair of diametrically-spaced, arcuate-shaped anchoring segments 20, 22 which adapt the plate to be force fitted within an annular portion 24 of the shaft 12. The shaft portion 24 has a greater wall thickness than adjacent portions of the shaft. Also, an annular shoulder 26 protrudes inwardly toward the rotational axis A of the shaft 12 from generally the middle of the thickened shaft portion 24. The larger stiffener plate 14 is forcibly inserted into the shaft 12 so as to be lodged into abutment with one side of the annular shoulder 26, as seen in FIG. 1.

The balance weight mechanism 10 utilizes the stiffener plates 14, 16 as its support means within the shaft 12 for its remaining parts. These parts are comprised basically by a balance weight arm 28, a fastener 30, an annular face spline ring 32, and spline teeth 34.

The balance weight arm 28 has an elongated body 36 with opposite end portions 38, 40. End portion 38 has an opening 42 therethrough defined by an annular step 44 such that the diameter of the opening 42 on the front side 46 of the arm 28 is less than the diameter of the opening 42 on the back side 48 thereof. The reason for this will be pointed out later.

The fastener 30 provides means for attaching the balance weight arm 28 on the stiffener plates 14, 16 at a generally central location where the rotational axis A of the shaft 12 intersects the plates. Such location is at the center of a pair of aligned central holes 50, 52 formed in the respective stiffener plates 14, 16. The fastener 30 is comprised by a bolt 54 inserted through the opening 42 in the arm 28 and the holes 50, 52 in the plates 14, 16 from the front side 46 of the arm 28, and a self-locking nut 56 fixed on the rear side of the smaller plate 16 by a nut plate 58 fastened to the plate 16 by rivets 60. The nut 56 ensures that the bolt 54 does not become loosened during engine operation. The diameter of the hole 52 in plate 16 is smaller than the diameter of the hole 50 in plate 14. Clearance is provided about the bolt 54 within the hole 50 in plate 14 and within the larger diameter space within the end portion 38 of the balance weight arm 28 for capture and retention of a spring clip 62 for grasping the bolt 54.

The spring clip 62 prevents the bolt from falling out of the balance weight arm 28 during installation. Also, should the bolt become completely unthreaded from self-locking nut 56 during adjustment of the angular position of the balance weight arm 28, the spring clip 62 will retain the bolt in a desired orientation for facilitating re-fastening it to the nut 56 for tightening it against the arm 28 and stiffener plates 14, 16.

The annular spline ring 32 and spline teeth 35 provide cooperating means on the stiffener plate 14 and the balance weight arm 28 for maintaining the arm at a desired angular position on the plate 14 when the arm is attached thereto by the fastener 30. The annular spline ring 32 is formed on the front side of the plate 14 so as to encircle, but be radially displaced from, the central hole 50 in the plate. The spline teeth 34 are formed at the intersection of the end portion 38 and body 36 of the balance weight arm 28. In that position, the spline teeth 34 face toward the plate 14 and are aligned to intermesh with an arc of the annular spline ring 32 on the plate 16 for holding the arm 28 in a desired angularly adjusted position extending outwardly radially from the axis of rotation A of the shaft 12.

It will be observed that the available increments of angular adjustment are dependent on how many teeth are in the annular spline ring 32 on the plate 14. For example, if there are thirty teeth, then the balance weight arm could be adjusted in twelve degree increments; if there are forty-eight teeth, the arm could be adjusted in seven and one-half degree increments.

Also, it will be noted in FIG. 1 that the body 36 of the balance weight arm 28 and its end portion 38 form an acute angle at which the arm will extend away from plate 14 when attached thereto, thereby allowing clearance between the arm and plate for the intermeshing spline teeth. Also, the other end portion 40 of the arm 28 engages the shaft 12 when the arm 28 is fastened to the plate 14 so as to eliminate any tendency for setting up vibrations in the arm 28 upon rotation of the shaft 12.

The balance weight arm 28 can readily adapt to situations wherein different magnitudes of unbalance are experienced. The arms can be made in different weight classes, for example ranging from less than 0.5 ounce-inch to over 2 ounce-inches by changing the width and thickness of the arm. To correct for any particular unbalance condition, it would only be necessary to select the proper size balance weight arm and adjust it to the desired angular position about the rotational axis A by loosening the bolt 54, rotating the arm 28 about the bolt and then tightening the bolt. An opening 64 is provided in a side of the shaft for access to the balance weight mechanism 10 for making any necessary angular adjustments in the position of the arm 28.

It is thought that the present invention and many of the attendant advantages thereof will be understood from the foregoing description and it will be apparent that various changes may be made in the parts thereof without departing from the spirit and scope of the invention or sacrificing all of its material advantages, the form hereinbefore described being merely a preferred or exemplary embodiment thereof.

Having thus described the invention, what is claimed is:

1. A balance weight mechanism attached to a tubular engine shaft for correcting unbalance in the engine, comprising:
    (a) a stiffener plate mounted within said tubular shaft transversely to the rotational axis of said shaft;
    (b) a balance weight arm;
    (c) a fastener for releasably fastening an end of said balance weight arm to a generally central location on said stiffener plate where said axis of rotation of said shaft intersects said plate;
    (d) an annular face spline ring on said stiffener plate encircling and radially displaced from said central location thereon; and
    (e) spline teeth on said balance weight arm facing toward said stiffener plate and aligned to intermesh with an arc of said annular spline ring on said stiffener plate for holding said balance weight arm in a desired angularly adjusted position extending outwardly radially from said axis of rotation of said shaft.

2. The balance weight mechanism as recited in claim 1, further comprising:
    (f) a spring clip disposed within said end of said balance weight arm for holding said fastener to retain it, during adjustment of said angular position of said arm, in a desired orientation in relation to said stiffener plate for facilitating re-fastening of said fastener to said plate.

3. A balance weight mechanism attached to an engine shaft for correcting unbalance in the engine, comprising:
    (a) a plate mounted on said engine shaft in transverse relationship to the rotational axis thereof;
    (b) balance weight means comprising an elongated arm which extends at an acute angle away from said plate;
    (c) means for attaching said elongated arm on said plate at a generally central location where said rotational axis of said shaft intersects said plate, said attaching means being adjustable for releasing and re-attaching said elongated arm; and
    (d) interengaging teeth on said plate and said elongated arm for maintaining said balance weight means at a desired angular position when said balance weight means is re-attached to said support means.

4. The balance weight mechanism as recited in claim 3, wherein said elongated arm is one of a plurality of arms made in various weight classes by varying the width and thickness of the arms comprising said plurality, whereby to correct for unbalance it is only necessary to select the proper size arm from said plurality and attach said selected arm on said plate at the desired angular position.

* * * * *